(12) United States Patent
Robison et al.

(10) Patent No.: US 7,175,732 B2
(45) Date of Patent: Feb. 13, 2007

(54) METHOD OF APPLYING SEAM TAPE TO THE EDGE OF A MEMBRANE

(75) Inventors: David Robison, O'Fallon, IL (US); Jay Esmon, Highland, IL (US)

(73) Assignee: Carlisle Management Company, Syracuse, NY (US)

( * ) Notice: Subject to any disclaimer, the term of this patent is extended or adjusted under 35 U.S.C. 154(b) by 0 days.

(21) Appl. No.: 10/766,541

(22) Filed: Jan. 28, 2004

(65) Prior Publication Data

US 2004/0188008 A1    Sep. 30, 2004

(51) Int. Cl.
*B32B 37/00* (2006.01)

(52) U.S. Cl. .................. 156/271; 156/259; 156/577; 156/523; 156/579; 493/347; 493/382

(58) Field of Classification Search ............... 156/271, 156/259, 270, 574, 523, 527, 530, 576, 577, 156/578, 247, 251, 260, 269, 512, 515, 524, 156/525, 526, 257, 579; 428/41.7, 41.8; 493/347, 382

See application file for complete search history.

(56) References Cited

U.S. PATENT DOCUMENTS

| | | | | |
|---|---|---|---|---|
| 2,589,202 A | 11/1952 | Newman | ............... | 282/19 |
| 2,782,014 A | 2/1957 | Giles | ............... | 206/59 |
| 3,386,527 A | 6/1968 | Daubert et al. | ............... | 181/33 |
| 3,917,501 A * | 11/1975 | Ferrucci et al. | ............... | 156/279 |
| 4,007,835 A | 2/1977 | Klothe | ............... | 206/411 |
| 4,032,385 A * | 6/1977 | Petry et al. | ............... | 156/252 |
| 4,288,877 A * | 9/1981 | Klepfer | ............... | 2/48 |
| 4,360,355 A * | 11/1982 | Suominen | ............... | 493/196 |
| 4,421,807 A | 12/1983 | Clausing et al. | ............... | 428/41 |
| 4,526,638 A * | 7/1985 | Clements | ............... | 156/159 |
| 4,648,935 A | 3/1987 | Brown et al. | ............... | 156/577 |
| 4,684,433 A * | 8/1987 | Gohr | ............... | 156/517 |
| 4,689,107 A * | 8/1987 | Entwistle | ............... | 156/465 |
| 4,715,915 A | 12/1987 | Vanderzee | ............... | 156/182 |
| 4,735,838 A | 4/1988 | Roberts et al. | ............... | 428/40 |
| 4,751,122 A | 6/1988 | May | ............... | 428/41 |
| 4,767,653 A | 8/1988 | Renstrom | ............... | 428/40 |
| 4,948,638 A | 8/1990 | Francis | ............... | 428/35.2 |
| 4,950,511 A | 8/1990 | Francis | ............... | 428/35.2 |
| 5,182,156 A | 1/1993 | Pape et al. | ............... | 428/130 |
| 5,466,211 A * | 11/1995 | Komarek et al. | ............... | 493/355 |
| 5,469,671 A | 11/1995 | Rathgeber et al. | ............... | 52/58 |
| 5,474,634 A * | 12/1995 | Termanini | ............... | 156/250 |
| 5,595,618 A * | 1/1997 | Fries et al. | ............... | 156/164 |
| 5,747,131 A | 5/1998 | Kreckel | ............... | 428/40 |
| 5,806,271 A | 9/1998 | Van Someren et al. | ............... | 52/750 |
| 5,935,669 A | 8/1999 | Leeuwenburgh | ............... | 428/40.1 |
| 5,970,640 A * | 10/1999 | Farrow | ............... | 40/638 |
| 6,124,018 A | 9/2000 | Yoshino | ............... | 428/40.1 |

(Continued)

FOREIGN PATENT DOCUMENTS

JP    4-25586    * 1/1992

*Primary Examiner*—Linda Gray
(74) *Attorney, Agent, or Firm*—Wood, Herron & Evans, L.L.P.

(57) ABSTRACT

Membrane sheeting with preapplied seam tape is formed by applying the seam tape to a preformed sheet along the center of the sheet. A cut is formed through the seam tape and sheeting. This forms two sheets with seam tape along one edge of each of the sheets.

10 Claims, 2 Drawing Sheets

U.S. PATENT DOCUMENTS

| | | | |
|---|---|---|---|
| 6,212,683 B1 * | 4/2001 | Liebmann | 2/49.4 |
| 6,217,692 B1 | 4/2001 | Kling | 156/229 |
| 6,378,259 B1 | 4/2002 | Carlson | 52/408 |
| 2001/0000902 A1 * | 5/2001 | Foubert et al. | 225/43 |

* cited by examiner

METHOD OF APPLYING SEAM TAPE TO THE EDGE OF A MEMBRANE

BACKGROUND

Single-ply membrane sheeting typically used for roofing and pond liners, or the like, incorporate a single-ply polymeric membrane as a water barrier. As it is impractical to manufacture sheeting which is large enough to cover entire roofs or ponds, individual sheets are adhered together along lap seams to form a continuous water impervious sheet which covers the roof.

In the past the lap seams have been completely formed at the construction site. This requires that, when necessary, the overlapping edges be cleaned, a primer applied and then an adhesive. A pressure sensitive adhesive seam tape is frequently used to form a lap seam. These are very tacky. Upon contact they adhere to the sheeting.

In order to reduce on-site labor, it is desirable to have the seam tape preapplied to the roofing membrane. In order to apply the seam tape to the edge of the sheeting, the edge of the sheeting is generally first coated with a primer which is allowed to dry and then the seam tape is applied to the edge of the sheeting. It is very important that the seam tape be precisely aligned with the edge of the sheeting.

SUMMARY OF THE INVENTION

The present invention is premised on the realization that seam tape can be formed precisely on the edge of membrane sheeting by forming a sheet that has a width twice the desired width and applying the seam tape to the center of the sheet. A slit is formed through the seam tape and sheeting to form two separate sheets each with seam tape precisely along one edge. This does not require the same precision as applying the seam tape to a preformed edge but it guarantees that the edge of the seam tape will lie exactly on the edge of the sheeting.

In a preferred embodiment, the tape is applies and the membrane is slit simultaneously The objects and advantages of the present invention will be further appreciated in light of the detailed description and drawings in which:

DETAILED DESCRIPTION

The present invention is a method of forming sheeting such as EPDM sheeting with factory applied seam tape. For purposes of the present invention, any commercially available seam tape can be used in the present invention. This can be either a pressure sensitive adhesive seam tape or even a thermoplastic seam tape. Generally a pressure sensitive adhesive seam tape is preferred for use in the present invention.

To apply the seam tape to the membrane sheeting, a primer is first applied along the area where the seam tape is to be applied. This area must be free of talc and dirt. After the primer dries, the seam tape is pressed against the sheeting and adheres thereto. The opposite side of the seam tape includes a release sheet that protects the seam tape until a lap seam is to be formed.

Figure 1:
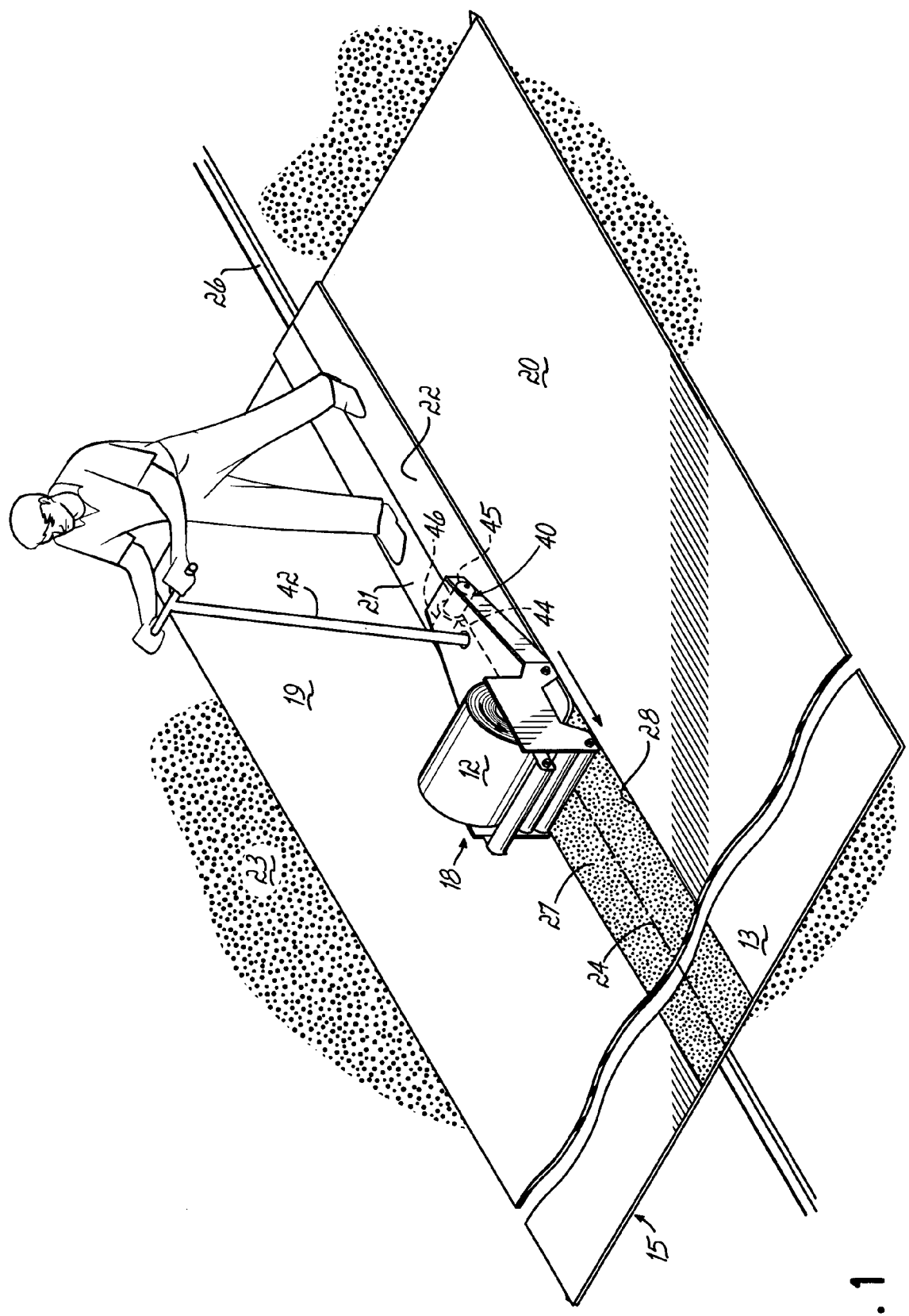
FIG. 1 is a diagrammatic depiction of the method of the present invention.

In the present invention, one starts with a membrane sheet 15 such as EPDM which is twice as wide as desired. As shown in FIG. 1, seam tape 12 is applied along the field portion 13 or center of the sheeting 15 and adhered thereto. The sheeting 15 is cut in half through the center of the seam tape 12. This forms two sheets 19, 20 each having a strip of seam tape 21, 22 along one edge of each sheet. Thus this permits one to form a membrane sheet having a seam tape precisely aligned with the edge of the sheeting. The sheeting is then rolled as desired and taken to a roof site for application.

Generally, the seam tape on the formed sheeting should have a width of at least about 3 inches. Therefore, in the present application a seam tape having a width of at least 6 inches and preferably 7 inches is applied to the center of the membrane sheet.

One method of applying and cutting the membrane sheet is shown in FIG. 1. In this embodiment the membrane sheet 15 is unrolled onto a floor 23. The floor 23 has a groove 26. The center line 24 of the membrane sheeting overlies this groove 26.

A straight line 28 is formed approximately 3½ inches to the left or right of the center line 21 of the sheet. This can be done with a chalk line or the like. With the line 28 as a guide, one applies a coating of primer 27. This is applied with a point roller. This assumes, of course, that the sheeting is clean sheeting. If not, any talc or the like must first be removed from the central portion of the sheeting.

The primer is applied along the center of the sheeting, 7 inches from line 28 to cover the entire area which will be in turn covered with the seam tape. Next, using seam tape applicator 18, an individual will apply the seam tape along the center 24 of the sheeting 15 and simultaneously slit the sheeting and seam tape.

Figure 2:
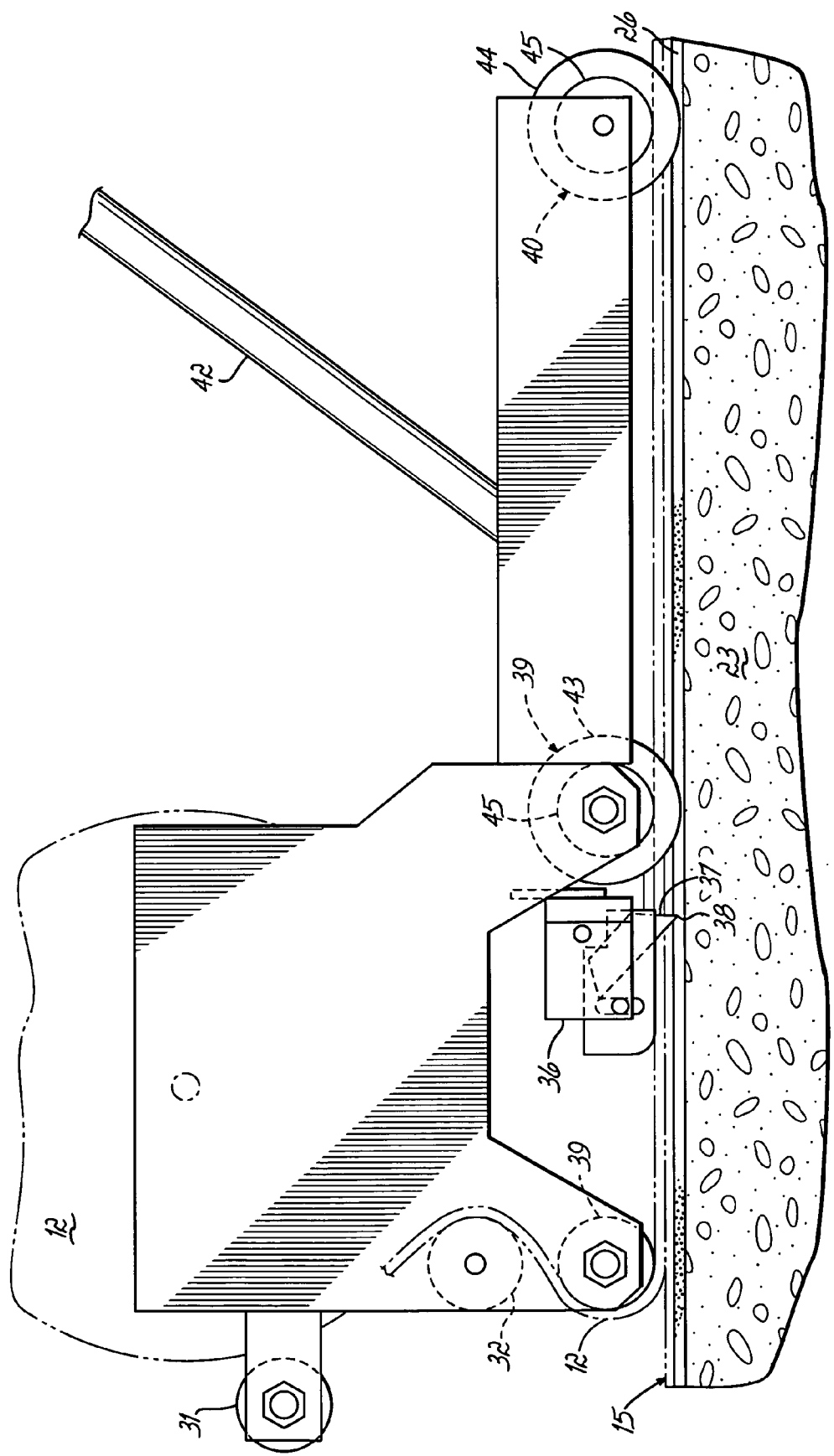
FIG. 2 is a cross section view of the seam tape applicator/slitter used in the present invention.

The applicator 18 used is a modification of the seam tape applicator disclosed in pending U.S. application Ser. No. 10/700,413, filed Nov. 4, 2003, entitled "Seam Tape Applicator" the disclosure of which is hereby incorporated in its entirety by reference. As shown in FIG. 2, this device supports a roll of seam tape 12. The apparatus 18 itself includes a series of guide rollers 31 and 32, and an applicator roller 33 that applies pressure upon the seam tape forcing it against the sheeting. Rearward of the applicator roller 33 is a blade holder assembly 36 which supports a utility knife blade 37 having a tip portion 38 designed to extend below the membrane sheeting and extending into groove 26.

Rearward of the blade assembly 36 are first and second guide wheel rollers 39 and 40. These two guide wheel rollers 39 and 40 are simply disks 43,44 centered between rollers 45 and 46. These fix disks 43,44 in the center line of the seam tape applicator where they are designed to ride in groove 26. This keeps the seam tape applicator 18 along the center line 24 of membrane 15 ensuring that the membrane sheeting is cut along its center line 24.

Thus, as an individual pushes the seam tape applicator 18 using handle 42, the guide rollers 39 and 40 riding in groove 26 maintain the seam tape applicator 18 along the center line 24 of membrane sheet 12. The roll of seam tape 12 supported on the seam tape applicator 18 will unroll the seam tape and apply it along the center line 24 of the membrane 15. As this occurs, the blade 37 cuts the membrane 15 into two halves 19 and 20 directly along its center line. The seam tape 12 has an upper protective release layer such as Teflon-coated paper, or the like (not shown), which permits the individual applying the seam tape 12 to walk directly upon the seam tape 12 as it is applied and cut.

The method of the present invention ensures that the two sheets 19 and 20 of roofing or pond liner material is formed having seam tape 21 and 22 along each of one edge of the respective sheets with the seam tapes aligned precisely along the edges. Further, this is accomplished with relatively minimal equipment and labor costs.

Once the sheeting is formed, it can then be rolled up and delivered to the work site. In order to form a uniform roll, the outer uncoated edges of the membrane can be folded backwards toward the seam tape without overlying the seam tape and then the folded sheet rolled. Another option is to simply locate filler strips along the field portion of the membrane so that when it is rolled it has a uniform thickness throughout. Another option is to roll two sheets together with the seam tape from the respective sheets on opposite side so that, again, a uniform cross sectional thickness is formed and the rolls have a uniform diameter throughout.

The sheeting is taken to the job site and unrolled. Adjacent sheets are applied to the roof or to the pond surface with a seam tape portion overlying an edge of an adjacent sheet. The release sheet is removed and pressure applied between the two sheets forming the lap seam seal.

We claim:

1. A method of forming a roofing membrane comprising applying a seam tape onto a sheet of membrane adapted for use as roofing membrane wherein said seam tape comprises a pressure sensitive adhesive strip covered on a first surface with a release sheet wherein said seam tape is applied to a center portion of said sheet of membrane by pressing a second surface of said seam tape against said sheet of membrane and cutting said sheet of membrane into two separate sheets by cutting completely through said sheet and through said seam tape and said release sheet along a central portion of said seam tape forming a continuous cut completely separating said sheet to form two totally separate sheets of roofing membrane each having a continuous portion of said seam tape and release sheet along one edge and rolling said two separate sheets.

2. The method claimed in claim 1 wherein said seam tape is applied to said membrane and said membrane is cut simultaneously.

3. The method claimed in claim 2 wherein said membrane is supported on a surface, said surface having a central groove aligned with said center portion of said membrane and wherein a seam tape applicator sheet slitter is run along said membrane guided by said groove to simultaneously apply said seam tape and cut said membrane.

4. An apparatus for applying seam tape along an edge of roofing membrane said apparatus comprising
   a seam tape applicator having a contact roll adapted to press seam tape against a surface of said roofing membrane, said applicator supporting a roll of seam tape, said seam tape comprising a pressure sensitive layer having first and second adhesive surfaces and a release sheet covering one of said adhesive surfaces;
   a slitter adapted to slit through said seam tape and said membrane; and
   said apparatus further comprising a handle providing means to push said apparatus over said roofing membrane.

5. The apparatus claimed in claim 4 further comprising guides.

6. The apparatus claimed in claim 5 wherein said guides comprise a plurality of disks located along the central axis of said apparatus.

7. The method claimed in claim 1 wherein said sheet of membrane is EPDM.

8. A method of forming a pond liner membrane comprising applying a seam tape onto a sheet of membrane adapted for use as a pond liner wherein said seam tape comprises a pressure sensitive adhesive strip covered on a first surface with a release sheet wherein said seam tape is applied to a center portion of said sheet of membrane by pressing a second surface of said seam tape against said sheet of membrane and cutting said sheet of membrane into two separate sheets by cutting completely through said sheet and through said seam tape and said release sheet along a central portion of said seam tape forming a continuous cut completely separating said sheet to form two totally separate sheets of pond liner membrane each having a continuous portion of said seam tape and release sheet along one edge and rolling said two separate sheets.

9. A method of forming a roof membrane comprising applying a seam tape onto a sheet of membrane adapted for use as a roofing membrane wherein said seam tape comprises a pressure sensitive adhesive strip covered on a first surface with a release sheet wherein said seam tape is applied to a center portion of said sheet of membrane by pressing a second surface of said seam tape against said sheet of membrane and simultaneously cutting said sheet of membrane into two sheets by cutting through said sheet and through said seam tape along a central portion of said seam tape to form two sheets of roofing membrane each having a continuous portion of said seam tape along one edge;
   and wherein said membrane is supported on a surface, said surface having a central groove aligned with a center portion of said membrane and wherein a seam tape applicator sheet slitter is run along said membrane guided by said groove to simultaneously apply said seam tape and cut said membrane.

10. A method of forming a roofing membrane comprising applying a seam tape onto a substrate wherein said seam tape comprises a pressure sensitive adhesive strip covered on a first surface with a release sheet and said substrate consists essentially of a polymeric membrane adapted for use as a roofing membrane wherein said seam tape is applied to a center portion of said sheet of membrane by pressing a second surface of said seam tape against said sheet of membrane and cutting said sheet of membrane into two separate sheets by cutting completely through said sheet and through said seam tape and said release sheet along a central portion of said seam tape forming a continuous cut completely separating said sheet to form two totally separate sheets of roofing membrane each having a continuous portion of said seam tape and release sheet along one edge and rolling said two separate sheets.

* * * * *